C. PELTER.
HOSE CLAMP.
APPLICATION FILED NOV. 18, 1915.
1,191,219.
Patented July 18, 1916.
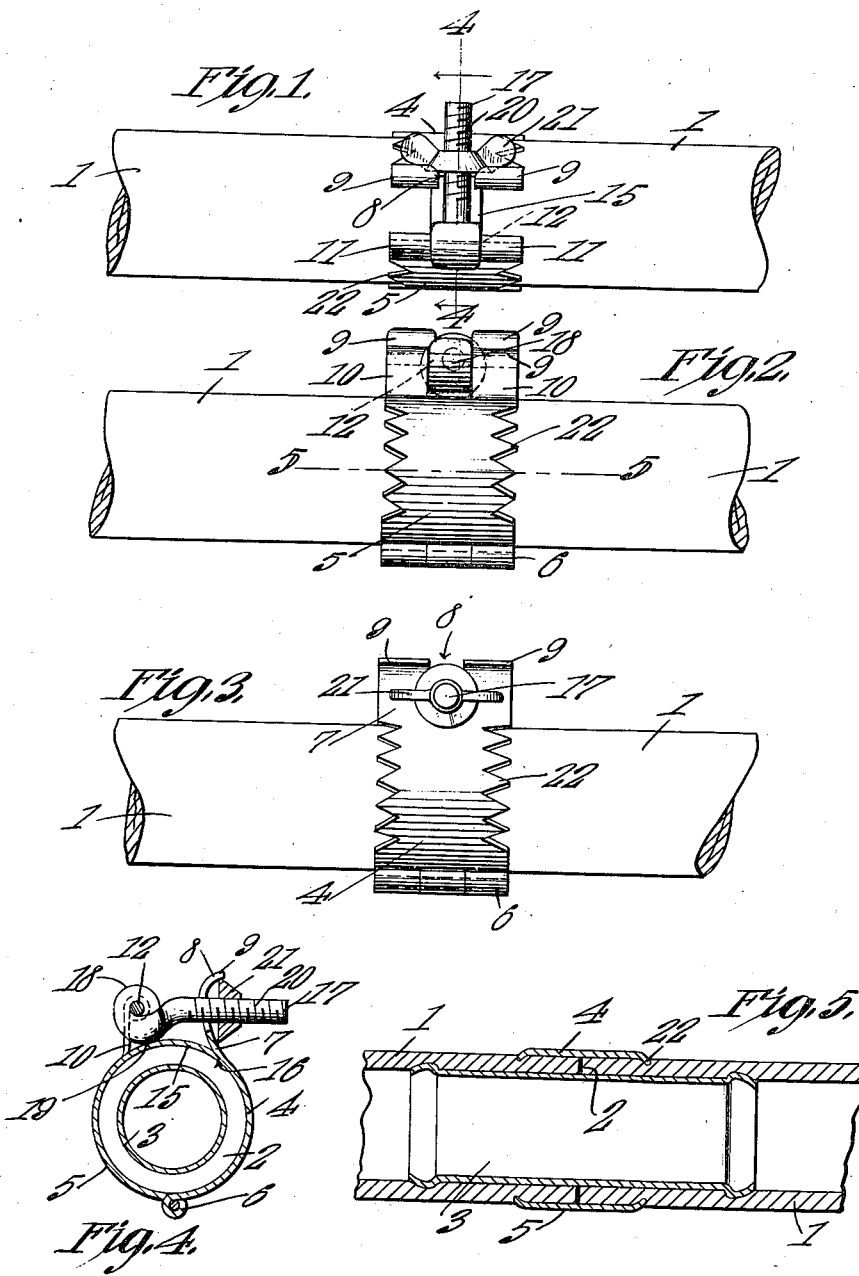
Witnesses
C. Pelter,
Inventor
by C.A. Snow & Co.
Attorneys

UNITED STATES PATENT OFFICE.

CHARLES PELTER, OF WALLA WALLA, WASHINGTON, ASSIGNOR OF ONE-HALF TO JOHN L. EGGERS, OF WALLA WALLA, WASHINGTON.

HOSE-CLAMP.

1,191,219.  Specification of Letters Patent.  Patented July 18, 1916.

Application filed November 18, 1915. Serial No. 62,175.

*To all whom it may concern:*

Be it known that I, CHARLES PELTER, a citizen of the United States, residing at Walla Walla, in the county of Walla Walla and State of Washington, have invented a new and useful Hose-Clamp, of which the following is a specification.

The device forming the subject matter of this application is a hose coupling, and one object of the invention is to improve the latch portion of the coupling so that the latch will act as a cam adapted to engage a tongue which bridges the space between the constituent members of the coupling.

Another object of the invention is to provide a coupling which coöperates in a novel manner with the nut on a tightening bolt, novel means being provided for assembling the tightening bolt with the ends of the coupling and for securing a proper coöperation between the ends of the coupling.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 is a top plan wherein the invention has been applied to a pair of hose sections; Figs. 2 and 3 are elevations showing opposite sides of the coupling; Fig. 4 is a section on the line 4—4 of Fig. 1; Fig. 5 is a section on the line 5—5 of Fig. 2.

In the accompanying drawings, the numeral 1 indicates a pair of hose sections, the meeting ends of which are designated by the reference character 2, it being the common practice to insert within the ends 2 of the sections 1, a tube 3.

In carrying out the present invention there is provided a coupling preferably made of metal throughout and embodying a main member 4 and an auxiliary member 5, each of approximately semi-circular outline, the members 4 and 5 being united by a hinge 6. The main member 4 is provided with an outwardly projecting shank 7 slotted as shown at 8 to form reversely curved ears 9.

The auxiliary member 5 of the coupling is provided with outwardly projecting ears 10 terminating in sockets 11 receiving a pivot pintle 12. Between the ears 10, the constituent material of the auxiliary member 5 is extended to form a resilient tongue 15, bridging the space between the movable ends of the members 4 and 5, and engaged as shown at 16 with the member 4 of the coupling below the slot 8 which defines the ears 9.

The invention comprises a latch 17 provided with an eye 18 mounted to swing on the pivot pintle 12, the inner edge of the eye being fashioned into a cam 19 adapted to bear on the tongue 15. Adjacent its free end, the latch 17 is threaded as shown at 20 to receive a wing nut 21. The transverse edges of the members 4 and 5 of the coupling are serrated or otherwise constructed to form bendable, hose engaging prongs 22.

In practical operation, the latch 17 is swung over until it passes between the ears 9 on the main member 4, after which the nut 21 is tightened up, the same bearing against the ears 9 and serving to draw the coupling closely around the sections 1 of the hose adjacent their abutting or meeting ends 2, the tongue 15 engaging with the member 4 as shown at 16. When the latch 17 is swung into the position of Fig. 4, the cam portion 19 of the latch coacts with the tongue 15 and serves to press the same down firmly onto the ends 2 of the hose sections 1. After the clamp has been tightened up sufficiently through a manipulation of the wing nut 21, the prongs 22 may be bent inwardly to engage the hose sections 1 as shown in Fig. 5. The wing nut 21 and the latch 17 constitute a means for tightening up the coupling or clamp, so that the prongs 22 may be advantageously engaged with the sections 1 of the hose. The prongs 22 prevent the clamp or coupling from moving lengthwise of the hose sections 1, as well as transversely thereof and, it will be obvious that the strain is divided between the prongs 22 and the ears 9. Owing to the presence of the prongs 22, it is not necessary to tighten up the wing nut 21 until the ears 9 are bent or distorted.

It is to be observed that the reversely curved ears 9 bear upon the periphery of the wing nut 10 and lie in the path of the wings on the nut, a rotation of the nut thus being prevented positively.

Having thus described the invention, what is claimed is:—

1. A hose coupling comprising relatively movable members, one of which is provided with a tongue extended toward the other member; and a pivoted latch forming a detachable connection between the members, the latch having a pivoting eye provided with a cam edge engaging the tongue.

2. In a device of the class described, an annular clamp; a latch pivoted to one end of the clamp; and a wing nut threaded onto the latch, the other end of the clamp having ears against which the nut bears, the ears being extended to engage the periphery of the nut and to lie in the path of the wings on the nut.

In testimony that I claim the foregoing as my own, I have hereto affixed my signature in the presence of two witnesses.

CHARLES PELTER.

Witnesses:
G. S. BOND,
B. B. MUSHETTE.